No. 843,079. PATENTED FEB. 5, 1907.
C. ELLIS.
PROCESS OF ENRICHING BLAST FURNACE GAS.
APPLICATION FILED DEC. 16, 1905.
2 SHEETS—SHEET 1.
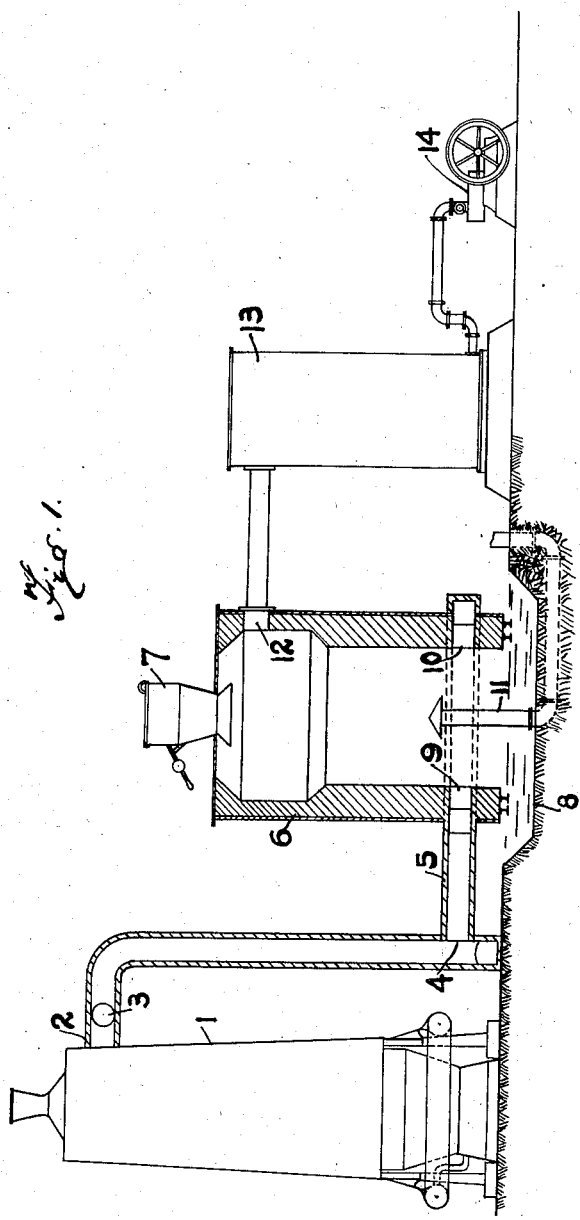
Witnesses
Inventor
Carleton Ellis

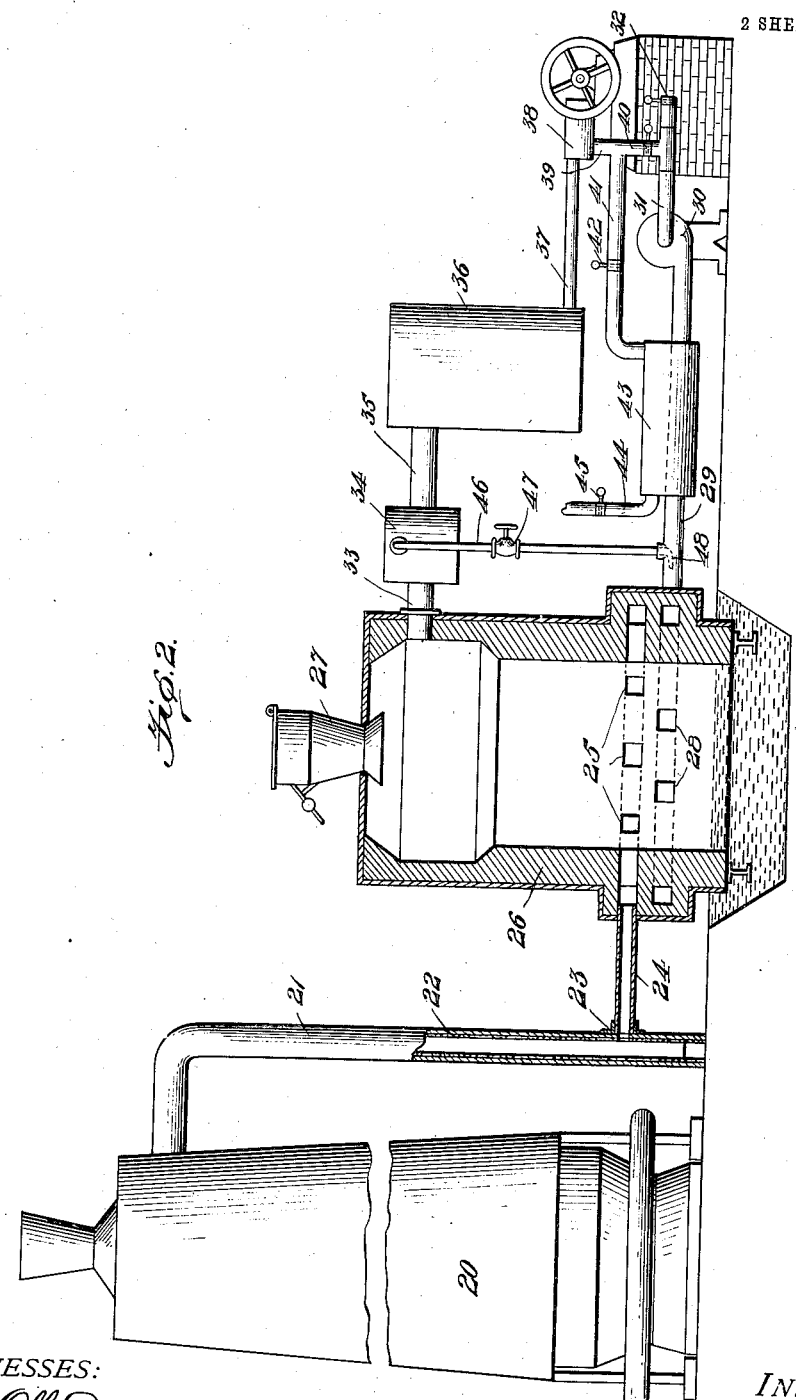

UNITED STATES PATENT OFFICE.

CARLETON ELLIS, OF WHITE PLAINS, NEW YORK.

PROCESS OF ENRICHING BLAST-FURNACE GAS.

No. 843,079.     Specification of Letters Patent.     Patented Feb. 5, 1907.

Application filed December 16, 1905. Serial No. 291,956.

*To all whom it may concern:*

Be it known that I, CARLETON ELLIS, a citizen of the United States, and a resident of White Plains, in the county of Westchester and State of New York, have invented a certain new and useful Process of Enriching Blast-Furnace Gas, of which the following is a specification.

This invention relates to a process of generating combustible gas, eminently suited to the operation of internal-combustion engines, from the waste gases of blast-furnaces, and consists in certain specific operations performed upon such waste gases, whereby their content of carbon monoxid and other combustible constituents is raised, all as more fully hereinafter set forth, matters of novelty being particularly pointed out in the appended claims.

The gases from a blast-furnace, such as is commonly used in the manufacture of iron, contain a large percentage of combustible matter, chiefly carbon monoxid, and many efforts have been made in the past to utilize such gases for the development of power. On the average blast-furnace or "tunnel-head" gas contains about fourteen per cent. of carbon dioxid, twenty-four per cent. of carbon monoxid, and about sixty per cent. of nitrogen. In attempts to use this gas directly for the operation of internal-combustion engines it has been found that engine-cylinders of very large dimensions are required as compared with those used for gas of higher calorific value, and therefore that a power plant to utilize any considerable portion of these gases is a very costly installation. The expense of such a plant in the past has debarred many pig-iron manufacturers from equipping their plants with internal-combustion engines. These gases, further, contain much dust, which is troublesome to remove and which is very detrimental to engine parts.

It is the object of the present invention to produce, with the aid of these waste gases, a clean rich gas well suited to the operation of gas-engines.

When a draft of ordinary air is passed into a deep bed of fuel, as in the ordinary gas-producer, the oxygen reacts with the carbon to form monoxid and dioxid, the latter being in turn reduced to monoxid for the most part as the draft-current passes through the hot fuel. In forming this monoxid one part, by volume, of oxygen becomes two of the monoxid. As air contains about twenty per cent. of oxygen, by volume, an air-draft current will produce a gas with a maximum content of monoxid of about thirty-five per cent. It is, however, desirable for the operation of internal-combustion engines to have gas rather richer than this, thereby permitting the obtaining of high power with moderate cylinder dimensions. To this end steam is frequently used in operating a producer, since it gives a gas of higher calorific value, yielding both carbon monoxid and hydrogen, both combustible; but for gas-engines any large amount of hydrogen is detrimental to smooth operation, owing to its tendency to preignition on high compression and to the fact that it burns at a different rate from carbon monoxid, so that adjustment to the best exploding conditions of one component in a mixed gas containing both hydrogen and monoxid does not meet the requirements of the other. Further, the low compressions which must be used with gas containing hydrogen necessitate larger and more expensive engines for equal powers.

Since neither air nor the products of combustion from ordinary fuel contain more than about twenty per cent. of oxygen, free or combined, it follows that to obtain without steam a gas richer in carbon monoxid than the limiting thirty-five per cent. it is necessary to employ for a draft-current a gas richer in oxygen, free or combined. Such a gas is found in the waste gases from blast-furnaces, which contain considerably more combined oxygen than simple products of combustion, since the reaction of iron oxids on carbon and the evolution of carbon dioxid from the carbonates both yield oxidized carbon without the presence of a proportionate amount of nitrogen, as in ordinary combustion. With a gas of the composition stated, for instance, a producer gas with nearly forty-five per cent. of carbon monoxid can be obtained. In one hundred volumes it already contains twenty-four per cent. of monoxid, and on reduction the fourteen per cent. of carbon dioxid yield twenty-eight volumes of monoxid. The monoxid is not affected by its passage through the fuel; but the dioxid is reduced, as stated, and this reduction is attended with an absorption of heat. For this reason blast-furnace gases cannot be passed in an unmixed state through the fuel indefinitely without chilling it below the gasifying-point.

My process consists in passing through the fuel-bed, together with the blast-furnace gases, the amount of air necessary to maintain the heat of the fuel-bed at the gasifying-point. Since, as stated, the air does not give as rich a gas as the blast-furnace gases and since its function in the producer is to keep up temperature, its amount may be advantageously reduced by introducing the furnace-gases hot and by heating the air itself. Air and furnace gases are so relatively proportioned as to keep the producer at an efficient gasifying-point without causing temperatures sufficient to form objectionable clinker or slag.

Blast-furnace gases being combustible, they cannot be mixed with the air before introducing the draft-current, since this would lead to explosions or combustion; but they are advantageously introduced at points relatively near each other.

In the accompanying illustration I have shown, more or less diagrammatically, certain forms of the many structures adapted to perform my process.

In these illustrations, Figure 1 is a view of one form, partly in elevation and partly in section; and Fig. 2 is a view of another form, partly in elevation and partly in section.

In Fig. 1, 1 is a blast-furnace of the conventional type, having the offtake 2 in its upper part at the tunnel-head. In this offtake is shown an opening 3, connecting with piping (not shown) for conveying to heating-stoves such portion of the waste gases as may be required therein. The residue which is to be used in the present process goes through 2 to pipe 5, tapping conduit 2 at 4. Pipe 5 conducts the gases to gas-producer 6, extending around the lower portion of the producer, as a bustle-pipe, and communicating therewith through twyers 9 10. The producer is provided with a hopper 7 for the introduction of fuel, the latter being commonly coke or anthracite. Extending up in the center of the producer is the air-twyer 11, communicating with a source of air under pressure. (Not shown.) Producer 6 depends into the usual water seal 8. Gas from the producer is led off through pipe 12 and scrubber 13 to gas-engine 14.

In Fig. 2 blast-furnace 20 delivers waste gases through pipe 21, advantageously lined with heat-insulating material 22, to pipe 24, tapping 21 at 23. Pipe 24 delivers the gases through twyers 25 into producer 26. The producer is provided with fuel-hopper 27. Air is delivered through twyers 28, advantageously staggered, as shown, with regard to twyers 25, from a bustle-pipe communicating with pipe 29, fed by fan 30. Air enters the fan through pipe 31, provided with the valved air-inlet 32. Gas from the producer is led through pipe 33 35, encircled by the water-heater or steam-generator 34, scrubber 36, and pipe 37, to gas-engine 38. A controlled proportion of the products of explosion in this engine leaving through pipe 39 may be led through valved pipe 40 and introduced into air-pipe 31 to dilute the air therein, for a purpose later explained. The residue of such products is led through pipe 41, provided with valve 42, to a jacketing-casing 43, encircling air-pipe 29 and serving to heat the air therein. From 43 the products escape through pipe 44, provided with valve 45. Hot water from 34, or steam, as the case may be, is led through pipe 46, provided with valve 47, to nozzle 48 in pipe 29. In case of emergency or for other reasons the steam may be used in this nozzle to induce the draft-current in lieu of using the fan. Where small amounts of water-vapor are desired, water may trickle through the nozzle into the hot gases in 29.

In using the structure of Fig. 1 a bed of coals is brought to an efficient gasifying temperature in the producer and blast-furnace gases and air introduced therein through the appropriate twyers. The carbon dioxid of the furnace-gases is reduced to carbon monoxid with the absorption of heat, while the oxygen of the air also forms monoxid with development of heat, the two reactions, with proper proportioning of the two draft-currents, balancing each other and maintaining the fuel at an efficient gasifying temperature without production of objectionable clinker or slag. The gas produced by their conjoint action is scrubbed to remove any dust or tarry matter, and incidentally cooled to fit it for use in the engine. The bed of fuel in the producer acts as a gas-filter for the blast-furnace gases, removing the dust which has hitherto caused so much trouble in the operation of engines.

As stated, the blast-furnace gases being combustible on contact with air in the lower part of the producer some combustion takes place, but the carbon dioxid produced is reduced in the upper part of the fuel-bed. So far as keeping up the temperature of the fuel is concerned, it is a matter of indifference whether the air unites with the furnace-gases or the fuel; but it is more convenient to obviate this combustion as much as may be, and thereby prevent localized development of heat with attendant production of clinker, &c., and with the necessity for the use of water-cooled grate-bars or bars of refractory material. For this reason in both forms of apparatus shown the air-twyers and gas-twyers, while located near each other, are spaced apart.

In the apparatus of Fig. 2 air and gas are both introduced from twyers at the sides of the producer-chamber; but the two kinds of twyers alternate to minimize combustion. In order to supply as much external heat as possible, and thereby reduce the amount of air necessary, the heat of the blast-furnace gases is preserved as far as possible by the use of heat-insulating material in the downtake 21, and the air is heated by the waste gases from the gas-engine 38. The side introduction of the blast-furnace gases is preferred and is shown in both figures. This is for the reason that when clinker is formed it is apt to adhere to the side walls of the producer, and it is desirable to minimize its formation by introducing the furnace-gases at the sides, where they may exercise their chemical chilling action. To further reduce the possibility of injurious amounts of clinker forming, it is advantageous to dilute the air-draft with products of combustion, which may be conveniently derived from the gas-engine, as shown in Fig. 2. This is particularly advantageous in the side introduction of air, as shown in Fig. 2. Steam may also be admitted with this air as a cooling agent to prevent formation of clinker, bearing in mind, however, the fact previously stated that too great a quantity of hydrogen in the gas is disadvantageous in the operation of the engine.

The lateral introduction of air permits obtaining more even temperatures in the producer and is to be preferred with certain classes of fuel.

By controlling the relative amounts of blast-furnace gases and air introduced it is obvious that the temperature of the producer may be kept at an efficient gasifying-point, and it is also obvious that by using both hot, as described, the amount of the air may be reduced with advantage to the richness of the gas.

The present process solves a problem of great importance to iron manufacturers in making possible the use of blast-furnace gases by internal-combustion engines of moderate size without the necessity of employing a very costly plant. Furthermore, a gas of a more uniform quality is obtained. The combustible component of the gases is not changed or diminished, but it has added to it a further amount, with the result of producing a cheap rich gas.

What I claim is—

1. The process of generating a gas suitable for gas-engines which consists in continuously passing through a bed of hot fuel a combustible gas containing carbon monoxid and reducible amounts of carbon dioxid and in simultaneously passing through said fuel a current of air the relative proportion of air to gas supplied being that required to balance thermally the endothermic action of the carbon dioxid.

2. The process of generating a gas suitable for gas-engines which consists in continuously passing through a deep bed of hot fuel a combustible gas containing carbon monoxid and reducible amounts of carbon dioxid and in simultaneously injecting near the point of entry of said gas a current of air the relative proportion of air to gas supplied being that required to balance thermally the endothermic action of the carbon dioxid.

3. The process of generating a gas suitable for gas-engines which consists in continuously passing through a bed of hot fuel a hot combustible gas containing substantial amounts of carbon monoxid and reducible amounts of carbon dioxid and in simultaneously injecting near the point of entry of such gas a current of air the relative proportion of air to gas supplied being that required to balance thermally the endothermic action of the carbon dioxid.

4. The process of generating a gas suitable for gas-engines which consists in continuously passing through a deep bed of hot fuel hot combustible waste gases from a blast-furnace and in simultaneously injecting near the point of entry of said gases a current of air the relative proportion of air to gas supplied being that required to balance thermally the endothermic action of the carbon dioxid therein contained.

5. The process of generating a gas suitable for gas-engines which consists in continuously passing through a deep bed of hot fuel combustible waste gases from the reduction of iron ore and in simultaneously injecting near the point of entry of said gases a current of air the relative proportion of air to gas supplied being that required to balance thermally the endothermic action of the carbon dioxid therein contained and to maintain said fuel at an efficient gasifying temperature.

6. The process of generating a gas suitable for gas-engines which consists in continuously passing through a bed of hot fuel a combustible gas containing carbon monoxid and reducible amounts of carbon dioxid and in simultaneously passing through said fuel a hot current of air the relative proportion of air to gas supplied being that required to balance thermally the endothermic action of the carbon dioxid.

7. The process of generating a gas suitable for gas-engines which consists in continuously passing through a deep bed of hot fuel a combustible gas containing carbon monoxid and reducible amounts of carbon dioxid, and in simultaneously injecting near the point of entry of such gas a current of hot air the relative proportion of air to gas supplied being that required to balance thermally the endothermic action of the carbon dioxid.

8. The process of generating a gas suitable for gas-engines which consists in continuously passing through a bed of hot fuel a hot combustible gas containing substantial amounts of carbon dioxid and carbon monoxid and in simultaneously injecting near the point of entry of such gas a current of hot air the relative proportion of air to gas supplied being that required to balance thermally the endothermic action of the carbon dioxid.

9. The process of generating a gas suitable for gas-engines which consists in continuously passing through a deep bed of hot fuel hot combustible waste gases from a blast-furnace and in simultaneously injecting near the point of entry of such gases a current of hot air the relative proportion of air to gas supplied being that required to balance thermally the endothermic action of the carbon dioxid therein contained.

10. The process of generating a gas suitable for gas-engines which consists in continuously passing through a deep bed of hot fuel, hot combustible waste gases from the reduction of iron ore and in simultaneously injecting near the point of entry of said gases, a current of hot air the relative proportion of air to gas supplied being that required to balance thermally the endothermic action of the carbon dioxid therein contained and to maintain said fuel at an efficient gasifying temperature.

11. The process of generating gas suitable for gas-engines which consists in continuously passing through a deep bed of hot fuel hot combustible waste gases from the reduction of iron ore and in simultaneously injecting near the point of entry of said gases, a current of hot air the relative proportion of air to gas supplied being that required to balance thermally the endothermic action of the carbon dioxid therein contained, said air being diluted with an endothermic agent to prevent localized development of high temperatures in the fuel-bed.

12. The process of generating gas suitable for gas-engines which consists in continuously passing through a deep bed of hot fuel hot combustible waste gases from the reduction of iron ore and in simultaneously injecting near the point of entry of such gases a current of hot air the relative proportion of air to gas supplied being that required to balance thermally the endothermic action of the carbon dioxid therein contained, said air being diluted with products of combustion to prevent localized development of high temperature in the fuel-bed.

Signed at New York, in the county of New York and State of New York, this 7th day of December, A. D. 1905.

CARLETON ELLIS.

Witnesses:
FLETCHER P. SCOFIELD,
FRED I. SMITH.